(12) United States Patent
Lee et al.

(10) Patent No.: US 8,375,704 B2
(45) Date of Patent: Feb. 19, 2013

(54) EXHAUST SYSTEM

(75) Inventors: Jin Ha Lee, Seoul (KR); Jin Woo Park, Suwon (KR); Hyokyung Lee, Yongin (KR); Sangmin Lee, Yongin (KR); Jun Sung Park, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 12/604,054

(22) Filed: Oct. 22, 2009

(65) Prior Publication Data
US 2011/0023464 A1 Feb. 3, 2011

(30) Foreign Application Priority Data
Jul. 30, 2009 (KR) .................. 10-2009-0070235

(51) Int. Cl.
*F01N 3/00* (2006.01)
(52) U.S. Cl. .............. 60/286; 60/295; 60/297; 60/301
(58) Field of Classification Search .............. 60/285, 60/286, 295, 297, 301, 303, 311; 422/169, 422/171, 172, 177, 182
See application file for complete search history.

(56) References Cited

U.S. PATENT DOCUMENTS

| | | | | |
|---|---|---|---|---|
| 5,727,385 A * | 3/1998 | Hepburn | ...................... | 60/297 |
| 6,009,703 A * | 1/2000 | Bouchez et al. | ................. | 60/274 |
| 6,363,716 B1 * | 4/2002 | Balko et al. | ...................... | 60/286 |
| 6,677,264 B1 * | 1/2004 | Klein et al. | ...................... | 502/74 |
| 7,063,642 B1 * | 6/2006 | Hu et al. | ...................... | 477/100 |
| 7,150,145 B2 * | 12/2006 | Patchett et al. | ................. | 60/286 |
| 7,165,393 B2 * | 1/2007 | Betta et al. | ...................... | 60/286 |
| 7,198,764 B2 * | 4/2007 | Fisher et al. | ............. | 422/186.04 |
| 7,434,387 B2 * | 10/2008 | Yan | .................. | 60/286 |
| 7,610,751 B2 * | 11/2009 | McCarthy et al. | .............. | 60/286 |
| 7,614,214 B2 * | 11/2009 | Yan | .................. | 60/286 |
| 7,624,570 B2 * | 12/2009 | Reuter et al. | ................... | 60/286 |
| 7,669,408 B2 * | 3/2010 | McCarthy et al. | .............. | 60/286 |
| 2004/0163382 A1 * | 8/2004 | van Nieuwstadt et al. | ..... | 60/286 |
| 2007/0012032 A1 * | 1/2007 | Hu | .................. | 60/286 |
| 2007/0277507 A1 * | 12/2007 | Yan | .................. | 60/286 |

FOREIGN PATENT DOCUMENTS

KR 10-2008-0045912 A 5/2008

\* cited by examiner

*Primary Examiner* — Thomas Denion
*Assistant Examiner* — Jesse Bogue
(74) *Attorney, Agent, or Firm* — Morgan, Lewis & Bockius LLP

(57) ABSTRACT

An exhaust system may include an exhaust line through which a combusted exhaust gas is exhausted outside, a nitrogen oxide purification catalyst that is mounted on the exhaust line and uses unburned fuel or hydrocarbon to reduce one part of the nitrogen oxide in the exhaust gas and diffuse the other part thereof to store therein, an injector that injects fuel into the exhaust line, a fuel cracking catalyst that is disposed between the injector and the nitrogen oxide purification catalyst to activate the additionally injected fuel from the injector through thermal decomposition so as to generate a reducing agent of high reactivity, and a control portion that controls the injector to additionally inject fuel in a predetermined condition such that the nitrogen oxide purification catalyst uses the activated reducing agent to detach and reduce the nitrogen oxide that is stored therein.

16 Claims, 5 Drawing Sheets

EXHAUST SYSTEM

CROSS-REFERENCE TO RELATED APPLICATION

The present application claims priority to Korean Patent Application No. 10-2009-0070235 filed on Jul. 30, 2009, the entire contents of which are incorporated herein for all purposes by this reference.

BACKGROUND OF THE INVENTION

1. Field of the Invention

The present invention relates to an exhaust system. More particularly, the present invention relates to an exhaust system for reducing nitrogen oxide that is included in exhaust gas.

2. Description of Related Art

Generally, exhaust gas that is exhausted through an exhaust manifold of an engine is induced to pass through a catalytic converter that is mounted in the middle of an exhaust pipe to be purified, and the noise thereof is reduced while passing through a muffler before the exhaust gas is discharged to the outside through a tail pipe.

The catalytic converter processes the pollution materials that are included in the exhaust gas. Further, a particulate filter is mounted on the exhaust pipe to trap particulate material (PM) that is included in the exhaust gas.

A selective catalytic reduction device is a type of catalytic converter. Reducing agents such as carbon monoxide, total hydrocarbon (THC), and so on react well with nitrogen oxide rather than oxygen in the selective catalyst reduction apparatus (SCR), which is why it is called a selective catalyst reduction apparatus (SCR).

In an internal combustion engine to which the selective catalyst reduction apparatus is installed, the fuel is continuously and additionally injected additionally according to the nitrogen oxide amount in the exhaust gas. Accordingly, the hydrocarbon can be slipped from the selective catalyst reduction apparatus, and the fuel consumption is increased.

Also, when the reducing agent is continuously supplied, an oxidation/reduction reaction is also continuously performed in the exhaust pipe. Accordingly, the durability of the catalyst is deteriorated by reaction heat that is formed during the oxidation/reduction reaction.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Various aspects of the present invention are directed to provide an exhaust system having advantages that it stores nitrogen oxide of exhaust gas and injects additional fuel in a predetermined condition so as to desorb the stored nitrogen oxide such that purification efficiency of the nitrogen oxide is improved.

In an aspect of the present invention, an exhaust system may include an exhaust line through which combusted exhaust gas is exhausted outside, a nitrogen oxide purification catalyst that is mounted on the exhaust line and uses unburned fuel or hydrocarbon to reduce one part of nitrogen oxide in the exhaust gas, and diffuse the other part thereof to store therein, an injector that injects fuel into the exhaust line, a fuel cracking catalyst that is disposed between the injector and the nitrogen oxide purification catalyst to activate the additionally injected fuel from the injector through thermal decomposition so as to generate a reducing agent of high reactivity, and a control portion that controls the injector to additionally inject the fuel in a predetermined condition such that the nitrogen oxide purification catalyst uses the activated reducing agent to detach and reduce the nitrogen oxide that is stored therein.

The exhaust system may further include a catalyzed particulate filter mounted on the exhaust line to trap and eliminate particulate materials in the exhaust gas.

The injector, the fuel cracking catalyst, the catalyzed particulate filter, and the nitrogen oxide purification catalyst may be sequentially disposed in a flow direction of the exhaust gas.

The catalyzed particulate filter, the injector, the fuel cracking catalyst, and the nitrogen oxide purification catalyst may be sequentially disposed in a flow direction of the exhaust gas.

The injector, the fuel cracking catalyst, the nitrogen oxide catalyst, and the catalyzed particulate filter may be sequentially disposed in a flow direction of the exhaust gas.

At least one of the fuel cracking catalyst and the catalyzed particulate filter may include an oxidation catalyst function that oxidizes pollutant materials that are included in the exhaust gas.

In another aspect of the present invention, the exhaust system may include an oxidation catalyst that oxidizes pollutant materials that are included in the exhaust gas.

The injector, the fuel cracking catalyst, the oxidation catalyst, the catalyzed particulate filter, and the nitrogen oxide purification catalyst may be sequentially disposed in a flow direction of the exhaust gas.

The injector, the fuel cracking catalyst, the catalyzed particulate filter, the oxidation catalyst, and the nitrogen oxide purification catalyst may be sequentially disposed in a flow direction of the exhaust gas.

The injector, the oxidation catalyst, the fuel cracking catalyst, the catalyzed particulate filter, and the nitrogen oxide purification catalyst may be sequentially disposed in a flow direction of the exhaust gas.

The injector, the oxidation catalyst, the catalyzed particulate filter, the fuel cracking catalyst, and the nitrogen oxide purification catalyst may be sequentially disposed in a flow direction of the exhaust gas.

The injector, the catalyzed particulate filter, the oxidation catalyst, the fuel cracking catalyst, and the nitrogen oxide purification catalyst may be sequentially disposed in a flow direction of the exhaust gas.

The injector, the catalyzed particulate filter, the fuel cracking catalyst, the oxidation catalyst, and the nitrogen oxide purification catalyst may be sequentially disposed in a flow direction of the exhaust gas.

The injector, the fuel cracking catalyst, the nitrogen oxide catalyst, the oxidation catalyst, and the catalyzed particulate filter may be sequentially disposed in a flow direction of the exhaust gas.

The injector, the fuel cracking catalyst, the nitrogen oxide catalyst, the catalyzed particulate filter, and the oxidation catalyst may be sequentially disposed in a flow direction of the exhaust gas.

The injector, the fuel cracking catalyst, the catalyzed particulate filter, the nitrogen oxide catalyst, and the oxidation catalyst may be sequentially disposed in a flow direction of the exhaust gas.

The oxidation catalyst, the catalyzed particulate filter, the injector, the fuel cracking catalyst, and the nitrogen oxide purification catalyst may be sequentially disposed in a flow direction of the exhaust gas.

The catalyzed particulate filter, the oxidation catalyst, the injector, the fuel cracking catalyst, and the nitrogen oxide purification catalyst may be sequentially disposed in a flow direction of the exhaust gas.

The injector may include a first injector that injects the fuel into intake air or into a cylinder of an engine, and a second injector that is disposed in front of the nitrogen oxide purification catalyst to additionally inject fuel into the exhaust line, separately from the first injector.

As stated above, in a case that the nitrogen oxide amount that is stored in the nitrogen oxide purification catalyst is smaller than a predetermined value according to the present invention, the fuel is injected from the injector of the exhaust line, the additionally injected fuel is activated to be a reducing agent in the fuel cracking catalyst, and the nitrogen oxide that is stored in the nitrogen oxide purification catalyst is desorbed by the reducing agent to be purified.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
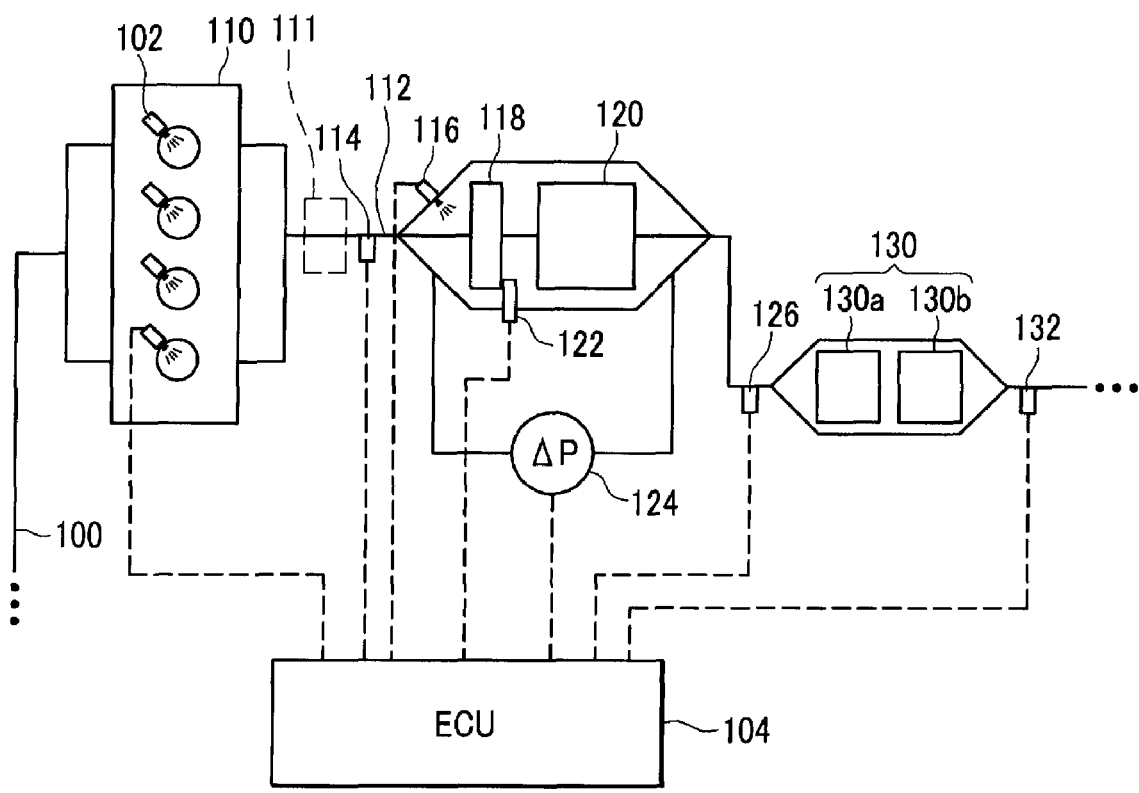
FIG. 1 is a schematic diagram of an exhaust system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an exhaust system according to an exemplary embodiment of the present invention.

Referring to FIG. 1, an exhaust system includes an intake line 100, a control portion 104, an engine 110, a first injector 102, an exhaust line 112, a turbocharger 111, a second injector 116, a fuel cracking catalyst 118, a catalyzed particulate filter 120, a nitrogen oxide purification catalyst 130, a differential pressure sensor 124, a first temperature sensor 114, a second temperature sensor 122, a third temperature sensor 126, and a fourth temperature sensor 132.

Combustion air is supplied to the intake line 100, and the first injector 102 that is mounted in the engine 110 injects gasoline or diesel fuel into a cylinder. In an exemplary embodiment of the present invention, the air and fuel are mixed within the intake manifold of the intake line 100 to be supplied.

The combusted exhaust gas in the cylinder of the engine 110 is exhausted outside through the exhaust line 112, the turbocharger 111 (e.g., turbine) is disposed at the exhaust line at the rear of the engine 110, and the turbocharger 111 is connected to the intake line 100 to supercharge the air into the engine.

The second injector 116, the fuel cracking catalyst 118, the catalyzed particulate filter 120, and the nitrogen oxide purification catalyst 130 are sequentially disposed on the exhaust line 112 at the rear of the turbocharger 111, the first temperature sensor 114 is disposed between the turbocharger 111 and the second injector 116, and the second temperature sensor 122 is disposed between the fuel cracking catalyst 118 and the catalyzed particulate filter 120.

The differential pressure sensor 124 detects the pressure differential between the front and rear of the catalyzed particulate filter 120 to transfer a signal thereof to the control portion 104.

The third temperature sensor 126 is disposed in the front of the nitrogen oxide purification catalyst 130, and the fourth temperature sensor 132 and a nitrogen oxide sensor can be disposed at the rear thereof. The first, second, third, and fourth temperature sensors (114, 122, 126, and 132) detect the temperature of the exhaust gas passing them, and the nitrogen oxide sensor detects the nitrogen oxide amount that is included in the exhaust gas.

The catalyzed particulate filter 120 traps particulate materials (PM) in the exhaust gas, and burns them in a predetermined condition.

The control portion 104 controls to regenerate the catalyzed particulate filter 120, in a case in which the pressure difference that is measured from the differential pressure sensor is higher than a predetermined value. In this case, the first injector 102 or the second injector 116 additionally injects fuel to combust the soot that is trapped within the catalyzed particulate filter 120.

The second injector 116 injects fuel into the exhaust line 112 according to the control of the control portion 104. Particularly, the fuel may be injected in a condition in which the temperature of the exhaust gas is higher than 200 degrees Celsius to be effectively evaporated.

The ratio of the HC in the exhaust gas to the nitrogen oxide that is stored in the nitrogen oxide purification catalyst 130 is set in map data, the control portion 104 compares the HC to NOx ratio with a predetermined value in the map data in a real driving condition, and in a case in which the value is lower than the predetermined value, the second injector 116 is operated to inject fuel into the exhaust line. That is, the HC to NOx ratio is increased.

The fuel cracking catalyst 118 cuts the chain ring of the carbon compound within the fuel through a catalyst reaction to resolve the fuel. That is, the fuel cracking catalyst 118 cuts the connection ring forming the hydrocarbon through a thermal cracking to resolve the fuel. Here, the thermal cracking is processed as in the following procedures.

$$C_{16}H_{34} \to 2n\text{-}C_8H_{17}^* \to n\text{-}C_6H_{13}^* \to n\text{-}C_4H_9^* \to C_2H_5^* \to C_2H_4$$

$$C_{16}H_{34} \to 8C_2H_4 + H_2, \text{* signifies a radical.}$$

Also, the fuel cracking catalyst 118 transforms a part of the hydrocarbon to hydrocarbon that combines with oxygen to activate the fuel that is injected from the second injector 116.

Further, the fuel cracking catalyst 118 transforms the fuel that is injected as liquid to be evaporated to the high reactivity reducing agent, simultaneously decreases the oxygen concentration by the oxidation reaction, and increases the temperature of the exhaust gas. Here, Pt, Pd, and Rh are used as catalyst components.

A nitrogen oxide detecting sensor can be disposed at the rear of the nitrogen oxide purification catalyst 130, and the nitrogen oxide detecting sensor detects the nitrogen oxide amount within the exhaust gas to transmit the pertinent signal to the control portion 104. Meanwhile, instead of using a nitrogen oxide detecting sensor, the storage amount of the NOx can be predicted from predetermined map data by experimental values.

The control portion 104 controls the fuel injection amount and the fuel injection timing based on signals that are detected by sensors and the map data to desorb and reduce the nitrogen oxide that is trapped in the nitrogen oxide purification catalyst 130.

For example, the control portion 104 controls the injector to additionally inject the fuel in a case in which the nitrogen oxide amount that is stored in the nitrogen oxide purification catalyst 130 is larger than a predetermined value.

Here, the control portion 104 controls the hydrocarbon (HC) to nitrogen oxide (NOx) ratio to become larger than a predetermined ratio so as to desorb and reduce the nitrogen oxide that is stored in the nitrogen oxide purification catalyst 130. Here, the predetermined ratio can be 8.

Referring to FIG. 1 again, the nitrogen oxide purification catalyst 130 includes a first catalyst 130a and a second catalyst 130b, the second catalyst 130b is disposed at the rear of the first catalyst 130a with a gap, and it is desirable that the heat resisting property of the first catalyst 130a is strengthened and the hydrocarbon reducing property of the second catalyst 130b is strengthened.

Figure 2:
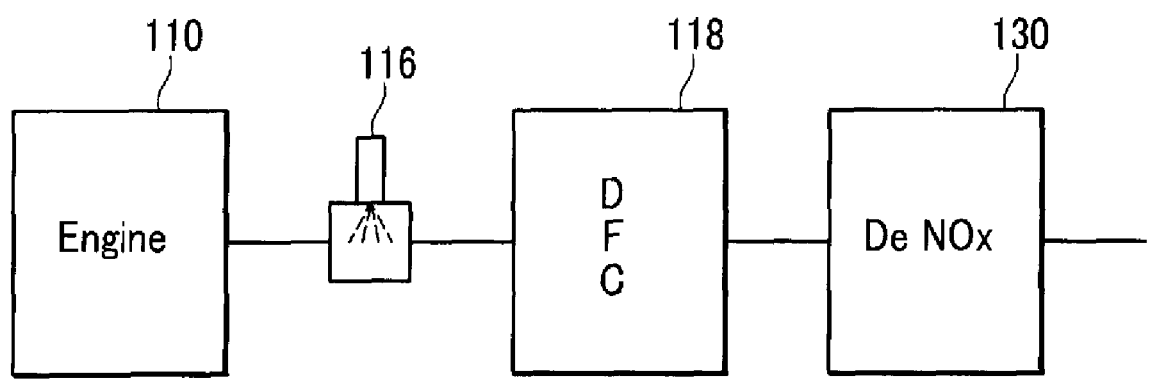
FIG. 2 is a basic schematic diagram of an exhaust system according to an exemplary embodiment of the present invention.

FIG. 2 is a basic schematic diagram of an exhaust system according to an exemplary embodiment of the present invention.

Referring to FIG. 2, on the exhaust line 112, the second injector 116 is disposed downstream of the engine 110, the fuel cracking catalyst 118 is disposed downstream of the second injector 116, and the nitrogen oxide purification catalyst 130 is disposed downstream of the fuel cracking catalyst 118.

Figure 3:
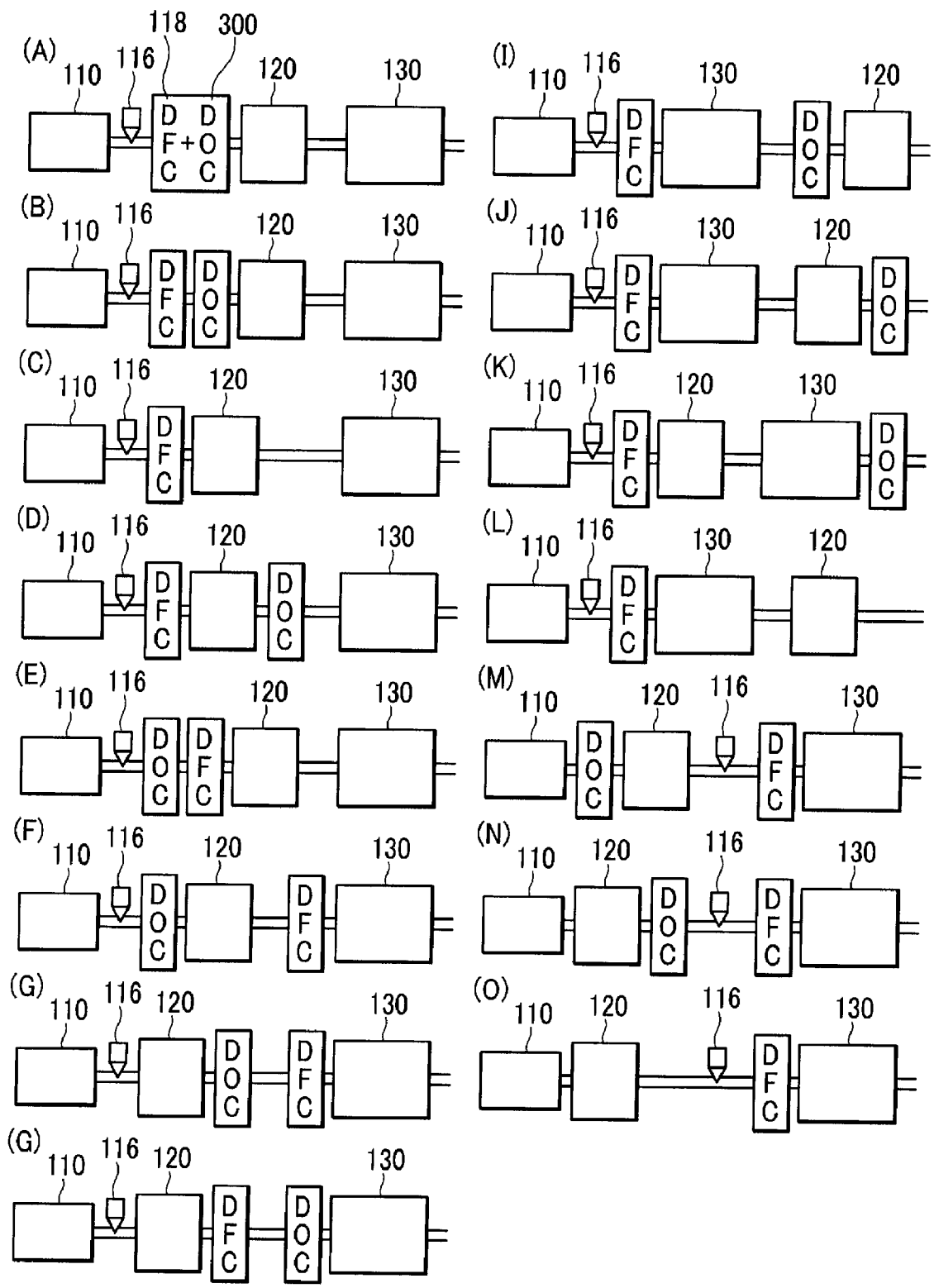
FIG. 3 shows transformed exemplary embodiments of an exhaust system according to the present invention.

FIG. 3 shows transformed exemplary embodiments of an exhaust system according to the present invention.

Referring to FIG. 3, the arrangement order of the second injector 116, the fuel cracking catalyst (118, DFC), the catalyzed particulate filter (120, DPF), the nitrogen oxide purification catalyst 130, and the oxidation catalyst (300, DOC) can be varied in a variety of embodiments.

Figure 4:
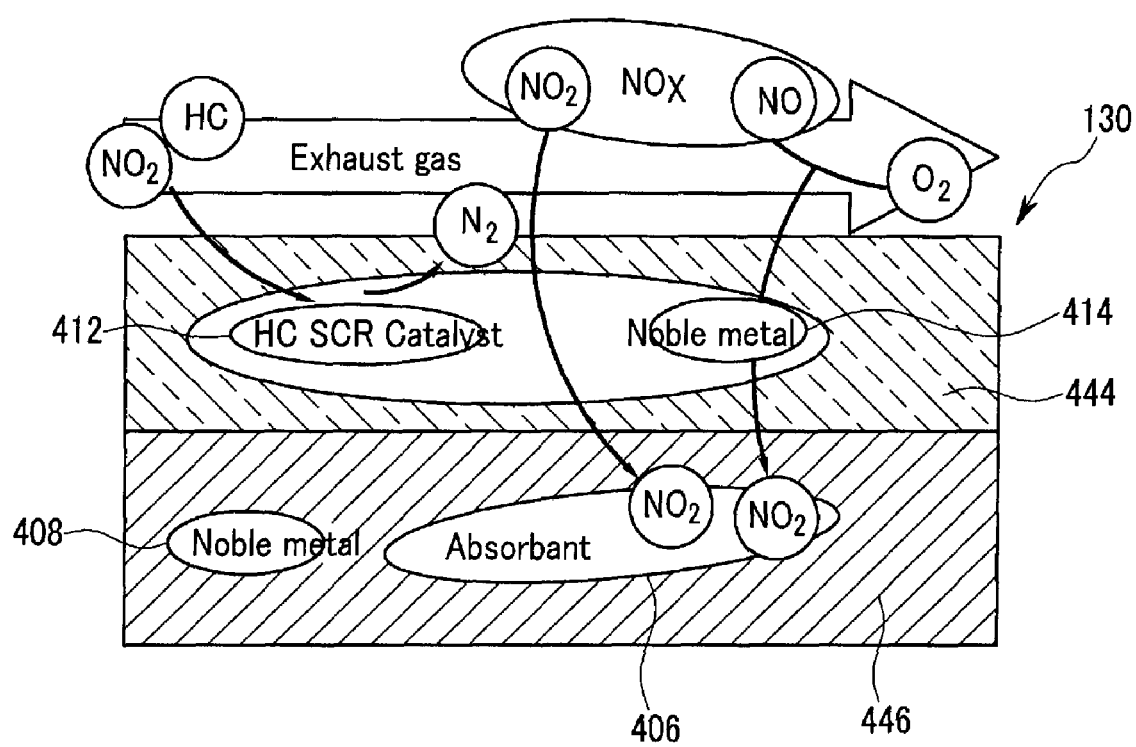
FIG. 4 is a schematic diagram showing a case in which nitrogen oxide is trapped in the exhaust system according to an exemplary embodiment of the present invention.

Referring to FIG. 4 and FIG. 6, the exhaust system is hereinafter detailed according to an exemplary embodiment of the present invention.

Figure 5:
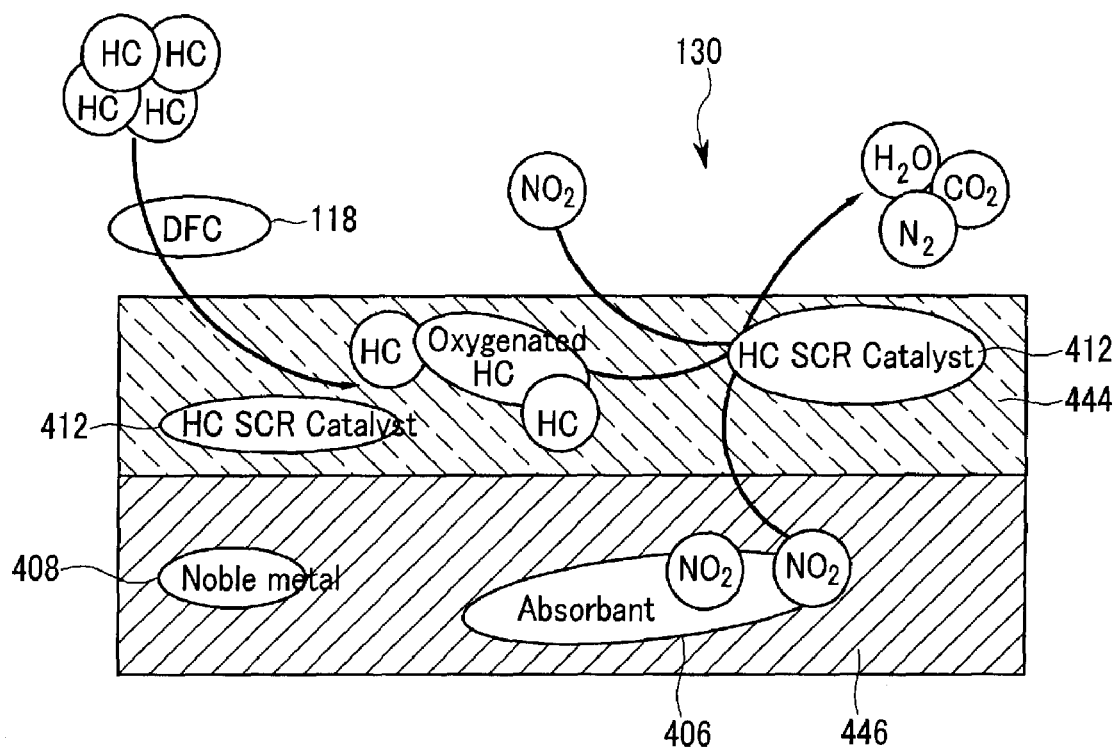
FIG. 5 is a schematic diagram showing a case in which nitrogen oxide is detached from the exhaust system according to an exemplary embodiment of the present invention.

FIG. 4 is a schematic diagram showing a case in which nitrogen oxide is trapped in the exhaust system according to an exemplary embodiment of the present invention, and FIG. 5 is a schematic diagram showing a case in which nitrogen oxide is detached from the exhaust system according to an exemplary embodiment of the present invention.

As shown in FIG. 4 and FIG. 5, the nitrogen oxide purification catalyst 130 includes first and second catalyst layers 444 and 446 that are coated on a support. The first catalyst layer 444 is disposed adjacently to the exhaust gas, and the second catalyst layer 446 is disposed adjacent to the support.

The first catalyst layer 444 oxidizes the nitrogen oxide of the exhaust gas, and reduces one part of the oxidized nitrogen oxide through an oxidation/reduction reaction with the unburned fuel or the hydrocarbon that are included in the exhaust gas.

Also, the other part of the oxidized nitrogen oxide is diffused into the second catalyst layer 446. As shown in FIG. 4 and FIG. 5, the first catalyst layer 444 includes at least one of a zeolite catalyst 412 and a metal catalyst 414 that is formed on porous alumina.

The zeolite catalyst 412 is a catalyst in which at least one element of copper, platinum, manganese, iron, cobalt, nickel, zinc, silver, cerium, and gallium thereof is ion exchanged. The chemical reaction in the zeolite catalyst 412 will be described as follows.

$$Z\text{—}Cu^{2+}O^- + NO \to Z\text{—}Cu^{2+}(NO_2^-)_{ads} \to Z\text{—}Cu^{2+} + NO_2$$

$$Z^+O^- + NO \to Z^+(NO_2^-)_{ads} \to Z^+NO_2$$

$$Z\text{—}Cu^{2+}(NO_2^-)_{ads} + NO \to Z\text{—}Cu^{2+}N_2O_3^{-ads} \to Z\text{—}Cu^{2+}O^- + N_2 + O_2$$

$$Z\text{—}H^+ + C_nH_{2n} \to Z\text{—}C_nH_{2n+1}^+ \xleftarrow{+n(Z\text{—}H) + C_nH_{2n}^+}$$

$$mNO_2 + C_nH_{2n}^+ \to C_nH_{2n}N_mO_{2m} \to N_2 + CO_2 + H_2O$$

Here, the "Z" signifies the zeolite, and the bottom suffix "ads" signifies adsorption.

Also, the metal catalyst 414 that is formed in the porous alumina includes at least one element of platinum, palladium, rhodium, iridium, ruthenium, tungsten, chrome, manganese, iron, cobalt, copper, and zinc. The chemical reaction in the metal catalyst 414 that is formed in the porous alumina is as follows.

$$NO + O_2 \to (NO_x)_{ads}$$

$$THC + (NO_x)_{ads} \to THC\text{-}ONO \text{ or } THC\text{-}NO_2$$

$$THC\text{—}NO_2 \to THC\text{-}NCO$$

$$THC\text{-}NCO + NO + O_2 \to N_2 + CO_2 + H_2O$$

Here, THC signifies hydrocarbon. As stated above, the hydrocarbon signifies the compound that is made up of carbon and hydrogen that are included in the exhaust gas and the fuel.

The second catalyst layer 446 stores one part of the oxidized nitrogen oxide of the first catalyst layer 444, and desorbs the stored nitrogen oxide through the additionally injected fuel in a predetermined condition to reduce them in the first catalyst layer 444.

As stated above, the predetermined condition is the case that the amount of nitrogen oxide that is stored in the second catalyst layer 446 is higher than a predetermined value of the map data, such that the reduction reaction of the nitrogen oxide is activated in the first catalyst layer 444.

The second catalyst layer 446 includes a noble metal 408 and a nitrogen oxide storage material 406. The nitrogen oxide storage material 406 can be a BaO (barium oxide or barium hydroxide). The noble metal 408 promotes the nitrogen oxide storage material 406 to store the nitrogen oxide. A variety of metal materials such as platinum, palladium, and so on can be an element of the noble metal 408.

Hereinafter, the operating principle according to the present invention will be described.

Nitrogen Oxide Storage Mode

In a case in which the amount of nitrogen oxide that is stored in the second catalyst layer 446 is smaller than a predetermined value, the nitrogen oxide in the exhaust gas is oxidized in the first catalyst layer 444, one part of the oxidized nitrogen oxide reacts with hydrocarbon of the exhaust gas through oxidation-reduction reaction to be a nitrogen gas, and the other part thereof is stored in the second catalyst layer 446. In this process, the hydrocarbon in the exhaust gas is oxidized to carbon dioxide. The reaction that is formed in the first catalyst layer 444 is displayed in the following formulas.

$$NO + 1/2O_2 \rightarrow NO_2$$

$$NO + HC \rightarrow HC \rightarrow 1/2N_2 + CO_2$$

Also, while the other part of the oxidized nitrogen oxide and the nitrogen oxide of the exhaust gas are diffused into the second catalyst layer 446 to be stored therein, the noble metal 408 of the second catalyst layer 446 promotes the nitrogen oxide storage material 406 to store the nitrogen oxide. The reaction that is formed in the second catalyst layer 446 is displayed in the following formulas.

$$BaO + 2NO_2 + 1/2O_2 \rightarrow BaNO_{32}$$

Nitrogen Oxide Regeneration Mode

In a case in which the nitrogen oxide that is stored in the second catalyst layer 446 is higher than a predetermined value, the control portion 104 controls the second injector 116 to inject the fuel. The additionally injected fuel passes through the fuel cracking catalyst (118, DFC), and the fuel is cracked to be low molecules. Also, one part of the low molecular hydrocarbon is transformed to be hydrocarbon that is combined with oxygen to pass through the nitrogen oxide purification catalyst 130.

At this time, the nitrogen oxide is desorbed from the second catalyst layer 446 through a replacement reaction with the hydrocarbon, and this process is briefly displayed as the following formula.

$$BaNO_{32} + 3CO \rightarrow BaCO_3 + 2NO + 2CO_2$$

Also, the nitrogen oxide is reduced to be nitrogen gas through the oxidation-reduction reaction between the hydrocarbon that is combined with the hydrocarbon/oxygen and the nitrogen oxide that is desorbed from the second catalyst layer 446 in the first catalyst layer 444, and the hydrocarbon that is combined with hydrocarbon/oxygen is oxidized to be carbon dioxide. This is displayed as the following formula.

$$NO + HC/\text{Oxygenated HC} = 1/2N_2 + CO_2$$

As described above, the nitrogen oxide and the hydrocarbon that are included in the exhaust gas are purified.

Instead of continuously injecting the fuel, the control portion 104 controls the second injector 116 to inject fuel while the HC to NOx ratio in the exhaust gas is lower than a predetermined value in an exemplary embodiment of the present invention. Accordingly, the fuel is additionally injected in the optimized condition according to the driving condition such that the slip of the hydrocarbon is prevented and the fuel consumption decreases.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system, comprising:
    an exhaust line through which combusted exhaust gas is exhausted outside;
    a nitrogen oxide purification catalyst that is mounted on the exhaust line and uses unburned fuel or hydrocarbon to reduce one part of nitrogen oxide in the exhaust gas, and diffuse the other part thereof to store therein;
    an injector that injects fuel into the exhaust line;
    a fuel cracking catalyst that is disposed between the injector and the nitrogen oxide purification catalyst to activate the additionally injected fuel from the injector through thermal decomposition so as to generate a reducing agent of high reactivity;
    a control portion that controls the injector to additionally inject the fuel in a predetermined condition such that the nitrogen oxide purification catalyst uses the activated reducing agent to detach and reduce the nitrogen oxide that is stored therein;
    wherein the nitrogen oxide purification catalyst includes first and second catalyst layers, the first catalyst layer being disposed close to the exhaust gas, and the second catalyst layer being disposed adjacent to the first catalyst layer;
    wherein the first catalyst layer reduces a portion of nitrogen oxide contained in the exhaust gas through an oxidation-reduction reaction with the unburned fuel or the hydrocarbon contained in the exhaust gas, and diffuses remaining portion of the nitrogen oxide to the second catalyst layer; and
    wherein the second catalyst layer stores the diffused nitrogen oxide, and releases the stored nitrogen oxide by a fuel additionally injected in a predetermined period such that the stored nitrogen oxide is reduced at the first catalyst layer,
    a catalyzed particulate filter mounted on the exhaust line to trap and eliminate particulate materials in the exhaust gas; and
    an oxidation catalyst that oxidizes pollutant materials that are included in the exhaust gas,
    wherein the injector, the oxidation catalyst, the catalyzed particulate filter, the fuel cracking catalyst, and the nitrogen oxide purification catalyst are sequentially disposed in a flow direction of the exhaust gas;
    wherein the control portion controls the injector to inject fuel when a ratio of the hydrocarbon in the exhaust gas to the nitrogen oxide stored in the nitrogen oxide purification catalyst is lower than a predetermined value;

wherein the first catalyst layer includes at least one of zeolite catalysts and metal catalysts supported in porous alumina; and wherein the second catalyst layer includes a noble metal and an NOx storing material.

2. The exhaust system of claim 1, wherein the injector, the fuel cracking catalyst, the catalyzed particulate filter, and the nitrogen oxide purification catalyst are sequentially disposed in a flow direction of the exhaust gas.

3. The exhaust system of claim 1, wherein the catalyzed particulate filter, the injector, the fuel cracking catalyst, and the nitrogen oxide purification catalyst are sequentially disposed in a flow direction of the exhaust gas.

4. The exhaust system of claim 1, wherein the injector, the fuel cracking catalyst, the nitrogen oxide catalyst, and the catalyzed particulate filter are sequentially disposed in a flow direction of the exhaust gas.

5. The exhaust system of one of the claim 1, wherein at least one of the fuel cracking catalyst and the catalyzed particulate filter includes an oxidation catalyst function that oxidizes pollutant materials that are included in the exhaust gas.

6. The exhaust system of claim 1, wherein the injector, the fuel cracking catalyst, the oxidation catalyst, the catalyzed particulate filter, and the nitrogen oxide purification catalyst are sequentially disposed in a flow direction of the exhaust gas.

7. The exhaust system of claim 1, wherein the injector, the fuel cracking catalyst, the catalyzed particulate filter, the oxidation catalyst, and the nitrogen oxide purification catalyst are sequentially disposed in a flow direction of the exhaust gas.

8. The exhaust system of claim 1, wherein the injector, the oxidation catalyst, the fuel cracking catalyst, the catalyzed particulate filter, and the nitrogen oxide purification catalyst are sequentially disposed in a flow direction of the exhaust gas.

9. The exhaust system of claim 1, wherein the injector, the catalyzed particulate filter, the oxidation catalyst, the fuel cracking catalyst, and the nitrogen oxide purification catalyst are sequentially disposed in a flow direction of the exhaust gas.

10. The exhaust system of claim 1, wherein the injector, the catalyzed particulate filter, the fuel cracking catalyst, the oxidation catalyst, and the nitrogen oxide purification catalyst are sequentially disposed in a flow direction of the exhaust gas.

11. The exhaust system of claim 1, wherein the injector, the fuel cracking catalyst, the nitrogen oxide catalyst, the oxidation catalyst, and the catalyzed particulate filter are sequentially disposed in a flow direction of the exhaust gas.

12. The exhaust system of claim 1, wherein the injector, the fuel cracking catalyst, the nitrogen oxide catalyst, the catalyzed particulate filter, and the oxidation catalyst are sequentially disposed in a flow direction of the exhaust gas.

13. The exhaust system of claim 1, wherein the injector, the fuel cracking catalyst, the catalyzed particulate filter, the nitrogen oxide catalyst, and the oxidation catalyst are sequentially disposed in a flow direction of the exhaust gas.

14. The exhaust system of claim 1, wherein the oxidation catalyst, the catalyzed particulate filter, the injector, the fuel cracking catalyst, and the nitrogen oxide purification catalyst are sequentially disposed in a flow direction of the exhaust gas.

15. The exhaust system of claim 1, wherein the catalyzed particulate filter, the oxidation catalyst, the injector, the fuel cracking catalyst, and the nitrogen oxide purification catalyst are sequentially disposed in a flow direction of the exhaust gas.

16. The exhaust system of claim 1, wherein the injector includes;

a first injector that injects the fuel into intake air or into a cylinder of an engine; and a second injector that is disposed in front of the nitrogen oxide purification catalyst to additionally inject fuel into the exhaust line, separately from the first injector.

* * * * *